(12) United States Patent
Fujinami

(10) Patent No.: US 6,272,346 B1
(45) Date of Patent: Aug. 7, 2001

(54) MANHOLE TYPE BASE STATION, MOBILE COMMUNICATION SYSTEM HAVING THE BASE STATION AND HAND-OFF CONTROL METHOD IN THE MOBILE COMMUNICATION SYSTEM

(75) Inventor: Akira Fujinami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/175,442

(22) Filed: Oct. 20, 1998

(30) Foreign Application Priority Data

Oct. 20, 1997  (JP) .................................................. 9-287285

(51) Int. Cl.[7] ...................................................... H04Q 7/20
(52) U.S. Cl. ........................................... 455/436; 455/561
(58) Field of Search ..................................... 455/436, 438, 455/556, 66, 561, 562; 340/870.02; 343/702

(56) References Cited

U.S. PATENT DOCUMENTS

| | | | |
|---|---|---|---|
| 5,345,448 | * | 9/1994 | Keskitalo ............................. 455/436 |
| 5,583,492 | * | 12/1996 | Nakanishi et al. ............... 340/870.02 |
| 5,924,033 | * | 7/1999 | Carlsson et al. ..................... 455/436 |
| 5,926,759 | * | 7/1999 | Severwright .......................... 455/431 |

FOREIGN PATENT DOCUMENTS

| | | |
|---|---|---|
| 1-137491 | 9/1989 | (JP) . |
| 5-22703 | 9/1993 | (JP) . |
| 5-227073 | 9/1993 | (JP) . |
| 8-86865 | 4/1996 | (JP) . |
| 8-97630 | 4/1996 | (JP) . |
| 8-149020 | * 6/1996 | (JP) . |
| 8-316905 | * 11/1996 | (JP) . |
| 9-200842 | 7/1997 | (JP) . |
| 11-66484 | 3/1999 | (JP) . |

* cited by examiner

*Primary Examiner*—Nay Maung
(74) *Attorney, Agent, or Firm*—Foley & Lardner

(57) ABSTRACT

A larger service area can be ensured, and a trouble such as a reduction in service area or the interruption of communication which is caused when an obstructive exists on a manhole cover is quickly prevented. A wall portion that defines a space in which a transmit/receive antenna is disposed has such a slope as to expand the space from a base station unit toward an upper surface portion of the manhole cover, and an angle of slope varies depending on the dimensions of the service area. Also, when the existence of the obstructive on the manhole cover is detected by use of a pressure sensor or an electric wave sensor, the control of the communication operation of a mobile station is switched to another base station without calculating or processing an electric field intensity in the base station.

20 Claims, 9 Drawing Sheets

MANHOLE TYPE BASE STATION, MOBILE COMMUNICATION SYSTEM HAVING THE BASE STATION AND HAND-OFF CONTROL METHOD IN THE MOBILE COMMUNICATION SYSTEM

BACKGROUND OF THE INVENTION

1. Field of the Invention

The present invention relates to a mobile communication system, and more particularly to a mobile communication system having a base station on a manhole cover laid on a road.

2. Description of the Related Art

Up to now, in a base station in the mobile communication system, in order to ensure an electric wave propagation distance, a transmit/receive antenna is located at a position higher in height than the ground where an unobstructed view is got, whereby a service area of the base station is ensured as large as possible, and the planning for placing base stations has been conducted restraining the number of the base stations.

However, the spread of the mobile communication system in the recent years makes the mobile communication system of the micro cell system spread. This leads to the necessity that a large number of base stations that covers small service areas are located so as to effectively utilize the frequency resources.

As a result, it becomes difficult to ensure locations where the base stations and the base station transmit/receive antennas are situated, and there has been demanded a method of locating the base stations and so on in which the base stations and the base station transmit/receive antennas can be located without degrading the beauty of streets.

Under the above circumstances, there has been proposed a system in which a sewerage or an underground multi-purpose duct is used as a transmission path between the switching centers, etc., and the base stations, optical fiber cables and power supply cables are situated in the sewerage, etc., and base station units are assembled with manhole covers provided on the main portions of the sewerage, etc.

For example, Japanese Patent Unexamined Publication No. Hei 5-227073 discloses a structural example of an information communication system in which a transmit/receive antenna and a photo-electric conversion device for conversion between a transmitter/receiver and an optical fiber cable are equipped in an manhole cover laid on a road.

However, the above conventional system suffers from r problems stated below.

FIGS. 11 and 12 are diagrams for explanation of problems with the conventional manhole type base station.

(1) In the transmit/receive antenna and other devices in the manhole type base station, because their located positions are fixed, an electric wave radiation angle of the transmit/receive antenna 111 is fixed as shown in FIG. 11, to thereby make the dimensions of a service area which can be covered by one base station constant.

The location of the manhole per se is determined by the technically required conditions for locating in the sewerage or the underground multi-purpose duct and conditions for maintenance and management in the sewerage or the underground multi-purpose duct.

For that reason, the manhole cannot be located provided that electric waves are radiated from the base station in a certain service area without any gaps. That is, a non-sensitive band is caused to always occur in the service area depending on the conditions such as intervals of the manholes, positions at which the manholes are located, places at which the manholes are located, and so on.

(2) Because the manhole cover per se is laid on the road, there is a case in which a person, a car or so on which passes along the road is put on the manhole or covers the manhole. In this case, the electric wave radiation from the base station is impeded, as a result of which a reduction of the service area, the interruption of communication, and so on occur frequently and rapidly.

In the conventional mobile communication system, a received electric field intensity is measured in the base station that controls the communication operation of the mobile station, and in the case where the received electric field intensity is weakened, the electric field intensities in the peripheral base stations are measured, and hand-off control that switches the operation to a base station having the highest electric field intensity is conducted. However, in the case where a reduction of the service area, the interruption of communication or the like occurs frequently and rapidly as described above, since the received electric field intensity in the base station is measured even after the reduction of the service area, the interruption of communication or the like occurs, a period of time of interruption becomes long, to thereby lead to a trouble such as an error of talking data or an instantaneous interrupt noise in the talking operation.

SUMMARY OF THE INVENTION

The present invention has been made in view of the problems with the above conventional art, and therefore an object of the present invention is to provide a manhole type base station, a mobile communication system having a plurality of manhole type base stations, and a hand-off control method in mobile communication system which is capable of ensuring a larger service area and quickly preventing a trouble such as a reduction of the service are or the interruption of communication even in the case where an obstructive exists on a manhole cover.

In order to achieve the above object, according to the present invention, there is provided a manhole type base station, comprising: a base station unit for controlling the communication operation of a plurality of mobile stations; and a transmit/receive antenna disposed in a space defined above the base station unit and directed to an upper surface of a manhole cover for transmitting and receiving an electric wave signal, the base station unit and the transmit/receive antenna being disposed in the interior of the manhole cover;

wherein the space in which the transmit/receive antenna is disposed expands toward an upper surface portion of the manhole cover from the base station unit.

Also, according to the present invention, there is provided a manhole type base station, comprising: a base station unit for controlling the communication operation of a plurality of mobile stations; and a transmit/receive antenna disposed on the base station unit toward an upper surface of a manhole cover for radiating and receiving an electric wave signal, the base station unit and the transmit/receive antenna being disposed in the interior of the manhole cover;

wherein the space in which the transmit/receive antenna is adjustable in height with respect to an upper surface portion of the manhole cover.

Still further, according to the present invention, the manhole type base station further comprises a pressure sensor disposed at a portion where the manhole cover is in contact with a portion of the ground which supports the manhole cover for detecting a pressure applied to the manhole cover.

Yet still further, according to the present invention, the manhole type base station further comprises an electric wave sensor for detecting a reflected wave of an electric wave transmitted from the transmit/receive antenna.

Yet still further, according to the present invention, there is provided a mobile communication system, comprising:

a plurality of manhole type base stations as mentioned above;

a control unit connected to the manhole type base station through a transmission path for controlling the communication operation of the manhole type base station; and a switching center connected to the control unit and a public telephone network for conducting switching operation with a plurality of the mobile stations and the public telephone network.

Yet still further, according to the present invention, there is provided a hand-off control method in a mobile communication system, when the pressure detected by the pressure sensor is larger than a predetermined value, the control of the communication operation of the mobile station is switched to another manhole base station.

Yet still further, according to the present invention, there is provided a hand-off control method in a mobile communication system, when the reflected wave of an electric wave transmitted from said transmit/receive antenna is detected by the electric wave sensor, the control of the communication operation of the mobile station is switched to another manhole base station.

In the above structure according to the present invention, although an electric wave is transmitted from or received by the transmit/receive antenna disposed in the manhole cover, since the space in which the transmit/receive antenna is disposed is so formed as to expand from the base station unit toward the upper surface portion of the manhole cover, a range that enables the electric wave to be transmitted by the transmit/receive antenna and a range that enables the electric wave to be received by the transmit/receive antenna are expanded.

Also, when the height of the transmit/receive antenna is adjustable, if the height of the transmit/receive antenna is set to be high, a range that enables the electric wave to be transmitted by the transmit/receive antenna and a range that enables the electric wave to be received by the transmit/receive antenna are expanded.

Further, in the case where the pressure sensor for detecting a pressure applied to the manhole cover is disposed at a portion where the manhole cover is in contact with a portion of the ground which supports the manhole cover, when the pressure detected by the pressure sensor is larger than a predetermined value, the control of the communication operation of the mobile station is switched to another manhole base station. As a result, a trouble such as a reduction in service area or the interruption of communication which is caused when an obstructive exists on a manhole cover can be quickly prevented without calculating or processing an electric field intensity or processing an electric field intensity in the base station.

Still further, in the case where the electric wave sensor for detecting a reflected wave of an electric wave transmitted from the transmit/receive antenna is provided, when the reflected wave of an electric wave transmitted from the transmit/receive antenna is detected by the electric wave sensor, the control of the communication operation of the mobile station is switched to another manhole base station. As a result, a trouble such as a reduction in service area or the interruption of communication which is caused when an obstructive exists on a manhole cover can be quickly prevented without calculating or processing an electric field intensity in the base station.

BRIEF DESCRIPTION OF THE DRAWINGS

These and other objects, features and advantages of this invention will become more fully apparent from the following detailed description taken with the accompanying drawings in which:

FIGS. 3(a) and 3(b) are diagrams showing one structural example of the manhole type base station shown in FIG. 2, in which FIG. 3(a) is a top view thereof and FIG. 3(b) is a cross-sectional view thereof;

FIG. 4 are diagrams for explanation of the operation of a pressure sensor and an electric wave sensor shown in FIGS. 3(a) and 3(b), in which FIG. 4 is a diagram for explanation of the operation of the pressure sensor, and FIG. 4 is a diagram for explanation of the operation of the electric wave sensor;

FIGS. 6(a) and 6(b) are diagrams showing another structural example of the manhole type base station shown in FIG. 2, in which FIG. 6(a) is a top view thereof and FIG. 6(b) is a cross-sectional view thereof;

DETAILED DESCRIPTION OF THE PREFERRED EMBODIMENTS

Now, a description will be given in more detail of a preferred embodiment of the present invention with reference to the accompanying drawings.

Figure 1:
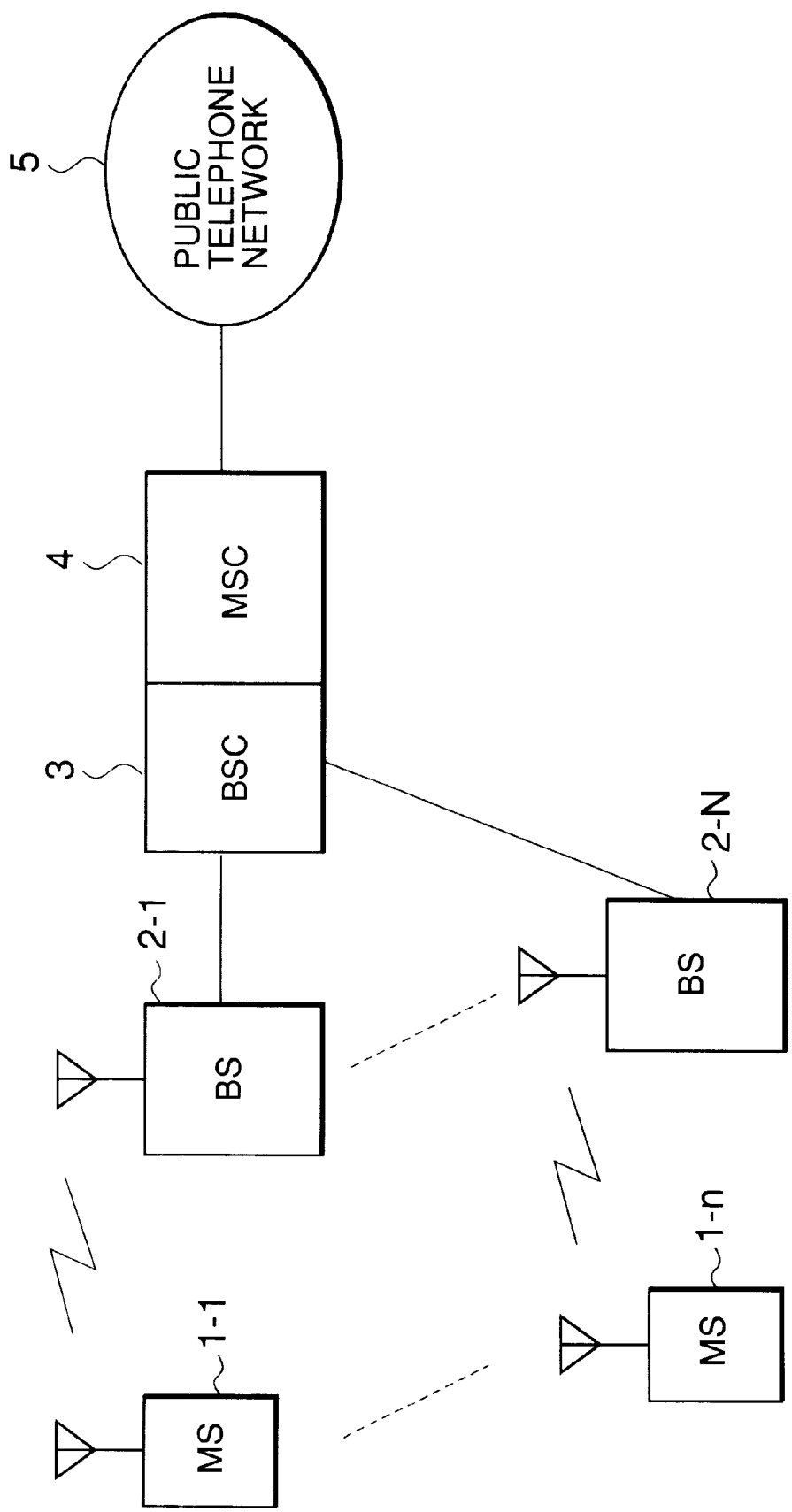
FIG. 1 is a conceptual diagram showing a general structural example of a mobile communication system.

FIG. 1 is a conceptual diagram showing a general structural example of a mobile communication system.

A general mobile communication system, as shown in FIG. 1, is made up of a plurality of mobile stations (MS) 1-1 to 1-n which conduct communication operation; a plurality of base stations (BS) 2-1 to 2-N which are connected to the mobile stations 1-1 to 1-n through a radio line (not shown) for controlling the communication operation of the mobile stations 1-1 to 1-n; a base station control unit (BSC) 3 which is connected to the plurality of base stations 2-1 to 2-N through a transmission path for controlling the communication operation of the base stations; and a mobile communication switching center (MSC) 4 which is connected to the base station control unit 3 and a public telephone network 5 for conducting switching operation with the mobile stations 1-1 to 1-n and the public telephone network 5.

Each of the mobile stations 1-1 to 1-n is also called "portable terminal" and made up of a small and light transmitter/receiver, a control unit, a man-to-machine interface unit, etc.

Also, each of the base stations 2-1 to 2-N is made up of a transmit/receive antenna, a base station amplifier, a base station modulator/demodulator, a voice processor, etc.

Further, the base station control unit 3 has a call processing function with respect to a call connection, an operation managing function for conducting a monitor and control of the self unit 3 and another base station control unit (not shown), etc. The call processing function is directed to a function which assigns a communication radio channel to a communication call every time the communication call occurs, and conducts hand-off as occasions demand, to maintain a radio channel and release the radio channel when the call is completed.

Also, the mobile communication switching center 4 has a function of registering the present position of a subscriber in a home memory, a trace connecting function of reading the home memory when a call is received at the moving subscriber, and connecting to a switching center in which the subscriber exists, and a general call function of calling subscribers (mobile stations) from all the base stations belonging to that switching center, a channel switching function for enabling communication to continue even if the subscriber moves the present zone to another zone, etc., in addition to a call and talk end detecting function, a signal transmit/receive function, a routing function, a charging function, etc.

Hereinafter, a description will be given of an embodiment in which the manhole type base station according to the present invention is applied to the mobile communication system structured as described above.

Figure 2:
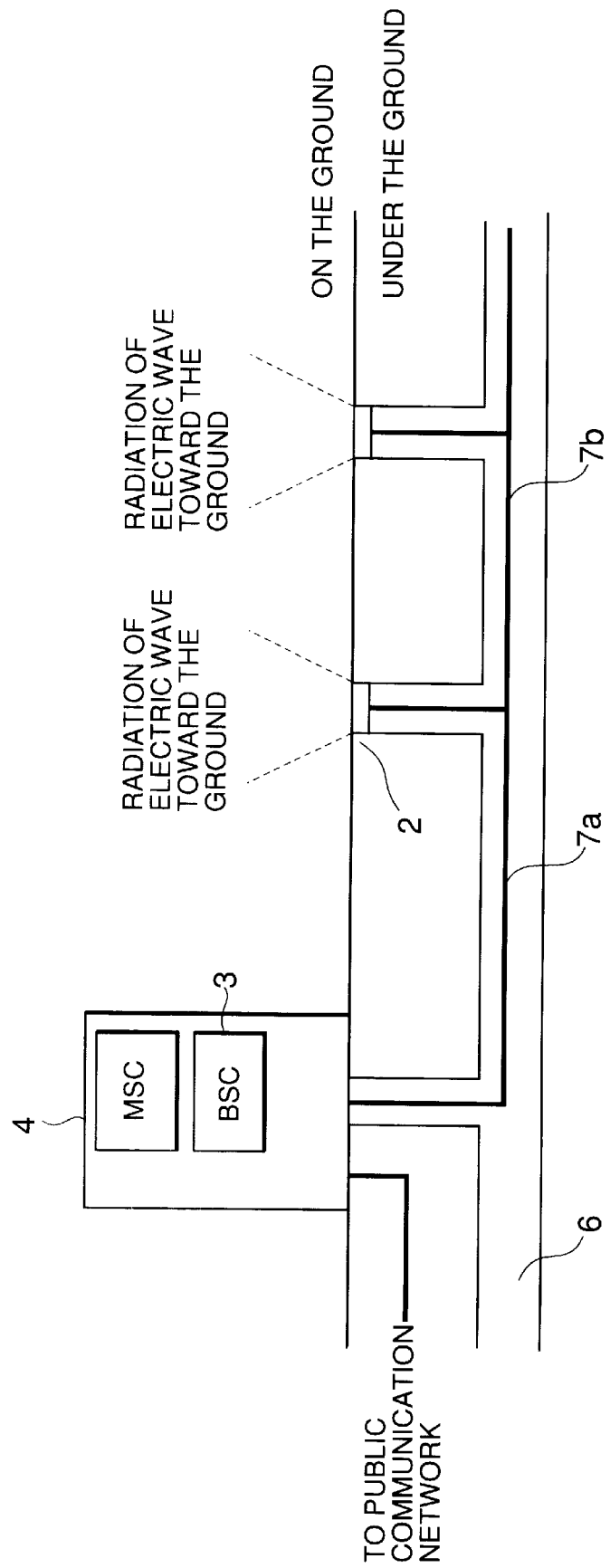
FIG. 2 is a diagram showing an embodiment in which a manhole type base station according to the present invention is applied to the mobile communication system shown in FIG. 1.

FIG. 2 is a diagram showing an embodiment in which a manhole type base station according to the present invention is applied to the mobile communication system shown in FIG. 1. In FIG. 2, there are also shown the outline of the location of a manhole type base station, and a state in which the manhole type base station 2 radiates an electric wave to the ground.

As shown in FIG. 2, a building in which the mobile communication switching center 4 and the base station control unit 3 are located is connected to a public telephone network through a transmission line, and to the manhole type base stations 2 through an optical fiber cable 7a and a power supply cable 7b disposed in a sewerage or a underground multi-purpose duct 6, respectively.

Hereinafter, the structure and the operation of the above-described manhole type base station will be described in more detail.

Figure 3A:
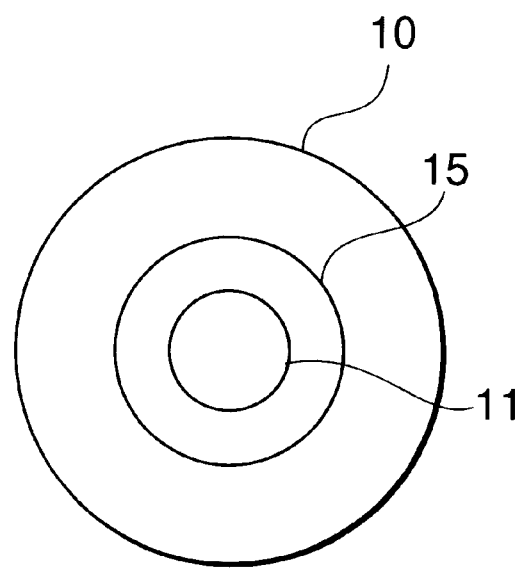
Figure 3B:
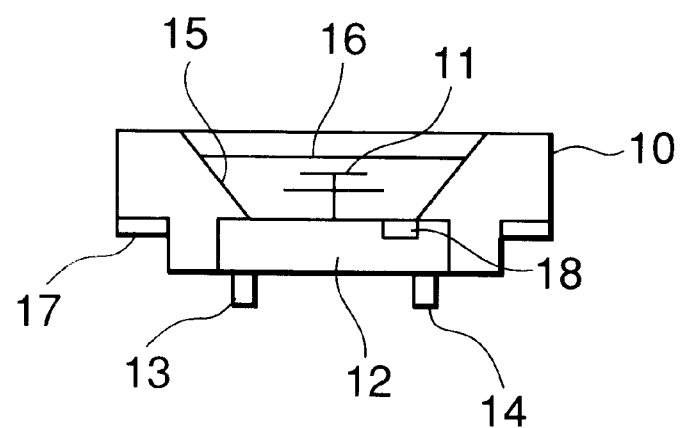

FIGS. 3(a) and 3(b) are diagrams showing one structural example of the manhole type base station 2 shown in FIG. 2, in which FIG. 3(a) is a top view thereof and FIG. 3(b) is a cross-sectional view thereof.

As shown in FIGS. 3(a) and 3(b), the manhole type base station 2 according to this embodiment includes, in the interior of a manhole cover 10, a base station unit 12 for controlling the communication operation of the mobile stations 1-1 to 1-n (refer to FIG. 1), a transmit/receive antenna 11 disposed on the base station unit 12 toward an upper surface of the manhole cover 10 for transmitting and receiving an electric wave signal, a pressure sensor 17 disposed at a portion where the manhole cover 10 is in contact with a portion of the ground which supports the manhole cover 10 for detecting a pressure applied to the manhole cover 10, an electric wave sensor 18 for detecting a reflected wave of an electric wave transmitted from the transmit/receive antenna 11, an optical fiber cable interface connector 13 that connects the base station unit 12 to the optical fiber cable 7a, and a power supply cable interface connector 14 that connects the base station unit 12 to the power supply cable 7b. The upper surface portion of the manhole cover 10 is covered with a dielectric substance 16.

One feature of this embodiment is that a wall portion 15 defining a space in which the transmit/receive antenna 11 is disposed has such a slope that the space expands from the base station unit 12 toward the upper surface portion of the manhole cover 10. An angle of slope is designed so as to be variable depending on the dimensions of the service area. The angle of slope of the wall portion 15 is varied in accordance with a design of locating the station, or a plurality of manhole covers 10 different in the angle of slope of the wall portions 15 are provided in advance, and one of those manhole covers 10 is selectively located in accordance with the dimensions of the service area.

The pressure sensor 17 detects a pressure applied to the manhole cover 10, thereby being capable of detecting whether a person, a car or the like is put on the manhole cover 10, or not.

The electric wave sensor 18 detects the reflected wave of an electric wave transmitted form the transmit/receive antenna 11, thereby being capable of detecting whether the upper surface portion of the manhole cover 10 is covered with a car or the like, or not.

Figure 4:
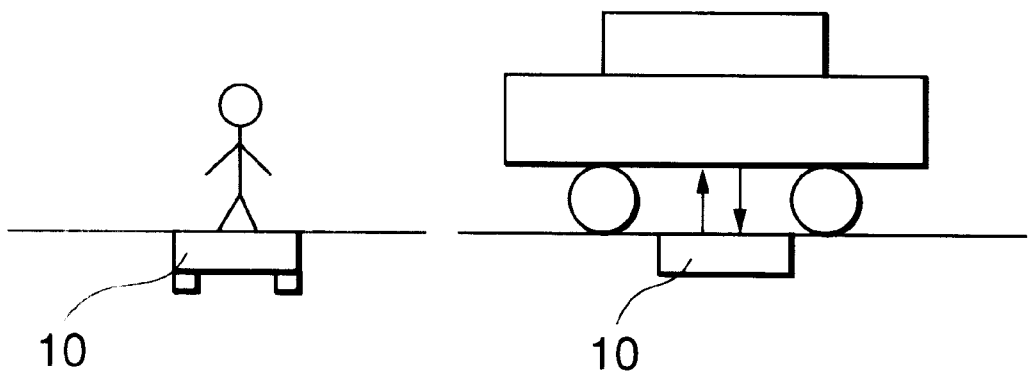

FIG. 4 are diagrams for explanation of the operation of a pressure sensor 17 and an electric wave sensor 18 shown in FIGS. 3(a) and 3(b), in which FIG. 4 is a diagram for explanation of the operation of the pressure sensor 17, and FIG. 4 is a diagram for explanation of the operation of the electric wave sensor 18.

As shown in FIG. 4, in the case where a person or the like is put on the manhole cover 10, the pressure sensor 17 detects its pressure, thereby detecting that the person or the like is put on the manhole cover 10. In the pressure sensor 17, a set value for judging whether the person or the like is put on the manhole cover 10, or not is predetermined, and when the detected pressure exceeds the set value, it is judged that the person or the like is put on the manhole cover 10.

Also, as shown in FIG. 4, in the case where the upper surface portion of the manhole cover 10 is covered with a car or the like, an electric wave transmitted from the transmit/receive antenna 11 is reflected by the car or the like which covers the upper surface portion of the manhole cover 10, and the electric wave sensor 18 detects the reflected wave, thereby detecting that the upper surface portion of the manhole cover 10 is covered with the car or the like.

Hereinafter, the operation of the manhole type base station structured as described above will be described.

Figure 5:
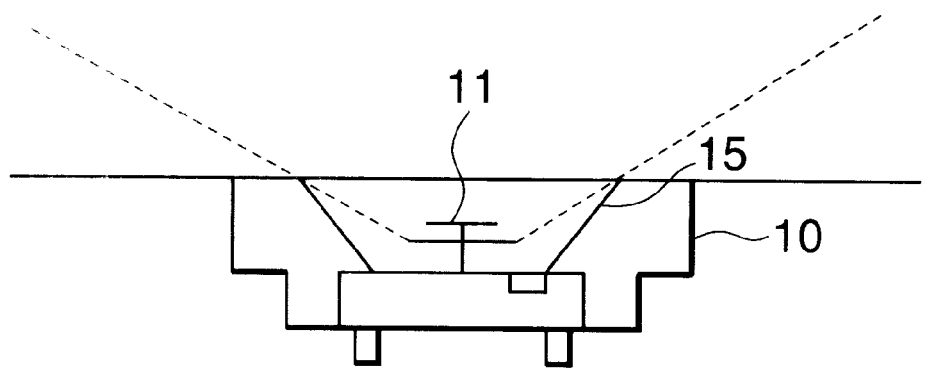
FIG. 5 is a diagram for explanation of the transmit/receive operation of an electric wave in the manhole type base station shown in FIG. 3.

FIG. 5 is a diagram for explanation of the transmit/receive operation of an electric wave in the manhole type base station shown in FIGS. 3(a) and 3(b).

In the manhole type base station, an electric wave is transmitted from the transmit/receive antenna 11 disposed within the manhole cover 10, or received by the transmit/receive antenna 11. In this embodiment shown in FIG. 5, the wall portion 15 defining a space in which the transmit/receive antenna 11 is disposed has such as slope that the space expands from the base station unit 12 toward the upper surface portion of the manhole cover 10. As a result, a range that enables the electric wave to be transmitted by the transmit/receive antenna 11 and a range that enables the electric wave to be received by the transmit/receive antenna 11 are expanded, thereby being capable of ensuring a larger service area.

In other words, the service area expands more as the angle of slope is small with respect to the ground, and the service area is narrowed as the angle of slope is made large so as to approach a right angle.

Figure 6A:
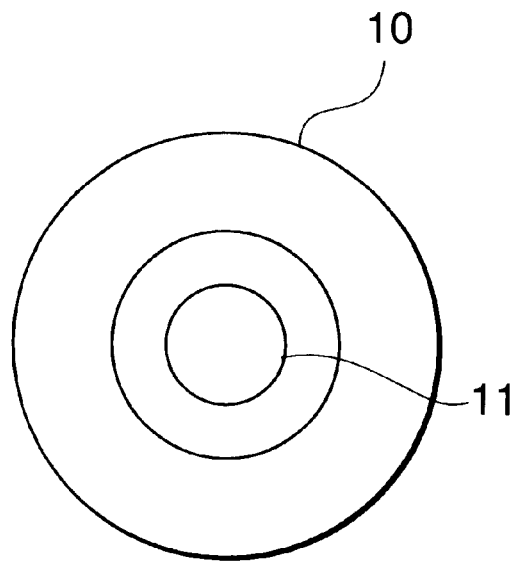
Figure 6B:
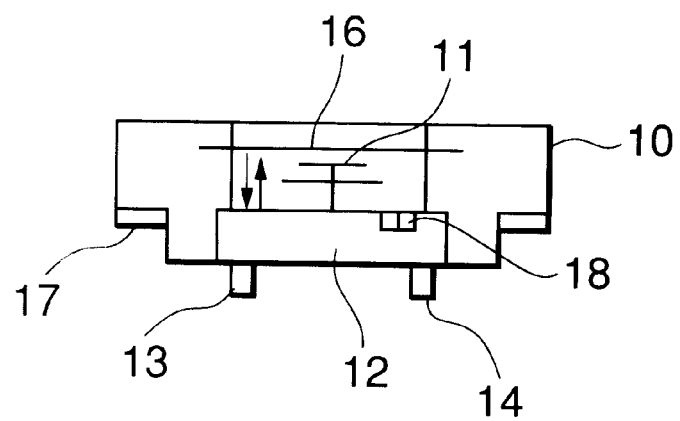

FIGS. 6(a) and 6(b) are diagrams showing another structural example of the manhole type base station 2 shown in FIG. 2, in which FIG. 6(a) is a top view thereof and FIG. 6(b) is a cross-sectional view thereof.

As shown in FIGS. 6(a) and 6(b), the manhole type base station 2 according to this embodiment includes, in the interior of a manhole cover 10, a base station unit 12 for controlling the communication operation of the mobile stations 1-1 to 1-n (refer to FIG. 1), a transmit/receive antenna 11 disposed on the base station unit 12 toward an upper surface of the manhole cover 10 so as to be adjustable in height for transmitting and receiving an electric wave signal; a pressure sensor 17 disposed at a portion where the manhole cover 10 is in contact with a portion of the ground which supports the manhole cover 10 for detecting a pressure applied to the manhole cover 10; an electric wave sensor 18 for detecting a reflected wave of an electric wave radiated from the transmit/receive antenna 11; an optical fiber cable interface connector 13 that connects the base station unit 12 to the optical fiber cable 7a; and a power supply cable interface connector 14 that connects the base station unit 12 to the power supply cable 7b. The upper surface portion of the manhole cover 10 is covered with a dielectric substance 16.

In the manhole type base station structured as described above, a height of the transmit/receive antenna 11 with respect to the upper surface portion of the manhole cover 10 is adjustable. The height of the transmit/receive antenna 11 is adjusted by that a plurality of transmit/receive antennas 11 different in height are prepared in advance, and one of those transmit/receive antennas 11 is selectively located in accordance with the dimensions of the service area, or that a connection portion of the transmit/receive antenna 11 and the base station unit 12 is structured into a sleeve, thereby making the height of the transmit/receive antenna 11 adjustable.

The operation of the pressure sensor 17 and the electric wave sensor 18 is the same as that shown in FIGS. 3(a) and 3(b).

Hereinafter, the operation of the manhole type base station structured as described above will be described.

Figure 7:
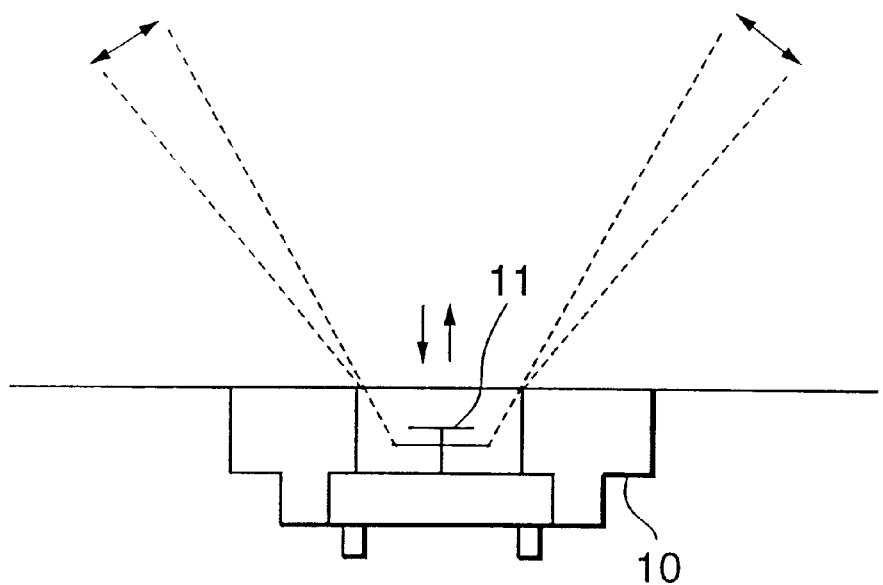
FIG. 7 is a diagram for explanation of the transmit/receive operation of an electric wave in the manhole type base station shown in FIG. 5.

FIG. 7 is a diagram for explanation of the transmit/receive operation of an electric wave in the manhole type base station shown in FIG. 5.

In the manhole type base station, an electric wave is transmitted or received by the transmit/receive antenna 11 disposed within the manhole cover 10. In this embodiment shown in FIG. 7, because the height of the transmit/receive antenna 11 is adjustable, when the height of the transmit/receive antenna 11 is made high, a range that enables the electric wave to be transmitted by the transmit/receive antenna 11 and a range that enables the electric wave to be received by the transmit/receive antenna 11 are expanded, thereby being capable of ensuring a larger service area.

In other words, the service area is expanded more as the height of the transmit/receive antenna 11 is made high, whereas the service area is narrowed more as the height of the transmit/receive antenna 11 is made low.

Figure 8:
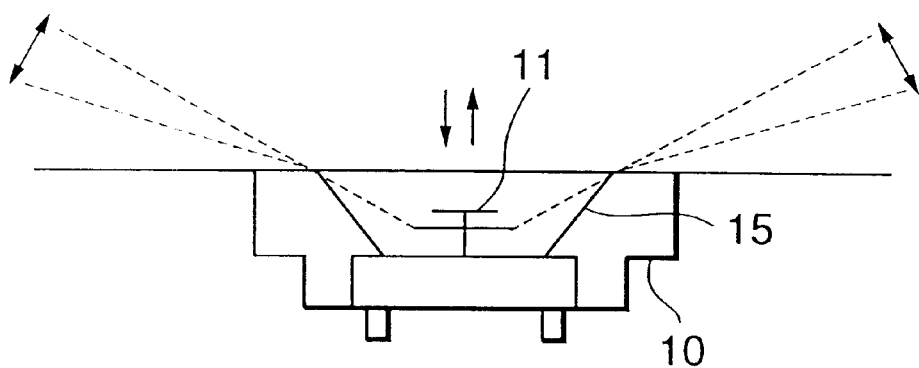
FIG. 8 is a diagram showing a manhole type base station combining the structure shown in FIGS. 3A and 3B with the structure shown in FIGS. 6(a) and 6(b)

FIG. 8 is a diagram showing a manhole type base station combining the structure shown in FIGS. 3(a) and 3(b) with the structure shown in FIGS. 6(a) and 6(b).

As shown in FIG. 8, when the structure shown in FIGS. 3(a) and 3(b) is combined with the structure shown in FIGS. 6(a) and 6(b), an angle of slope of the wall portion 15 is made small with respect to the ground, and the height of the transmit/receive antenna 11 is made high, a still larger service area can be realized.

Hereinafter, the hand-off operation of the above-described mobile communication system will be described.

Figure 9:
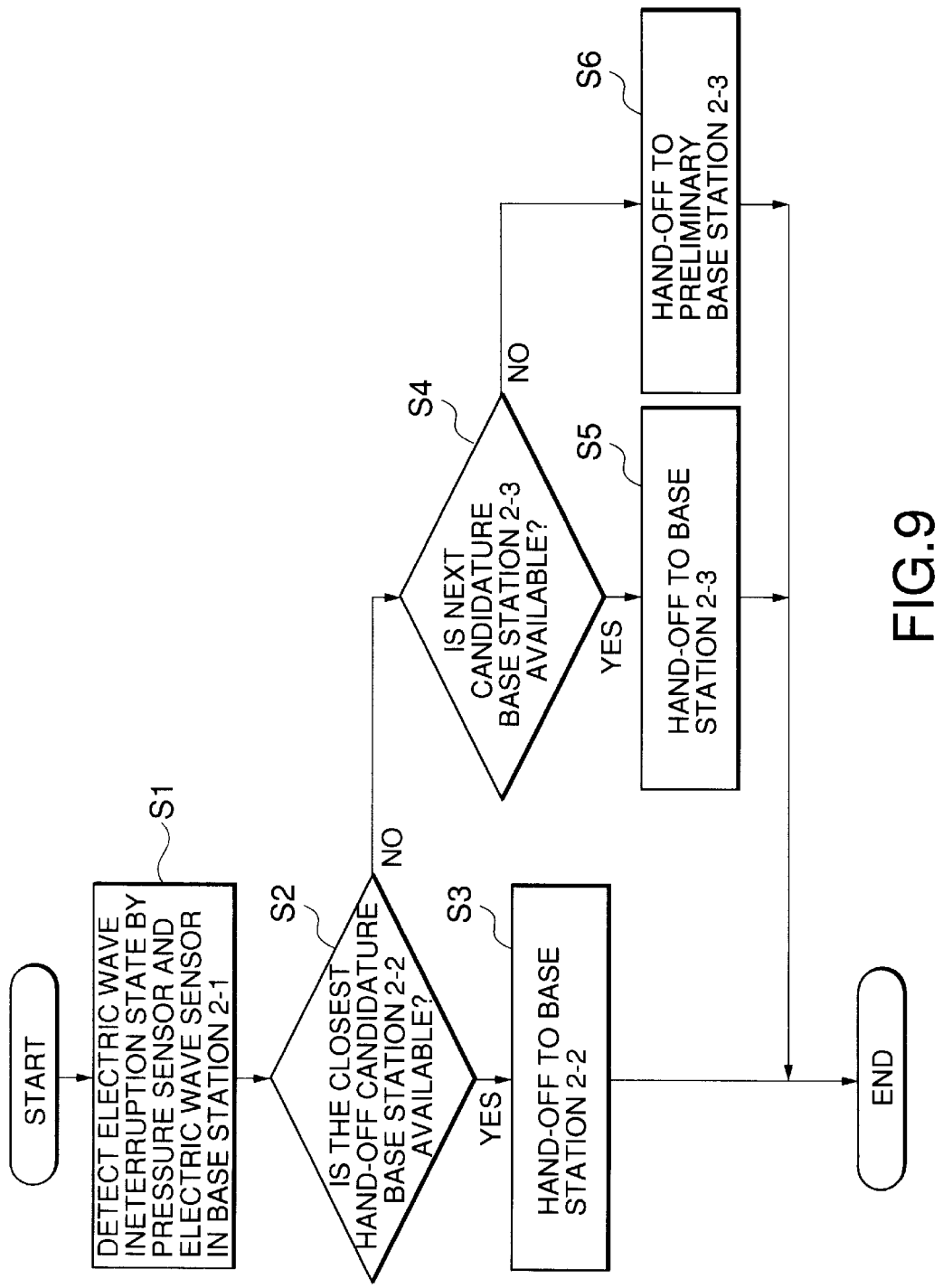
FIG. 9 is a flowchart for explanation of a hand-off operation in the mobile communication system shown in FIG. 2.
Figure 10:
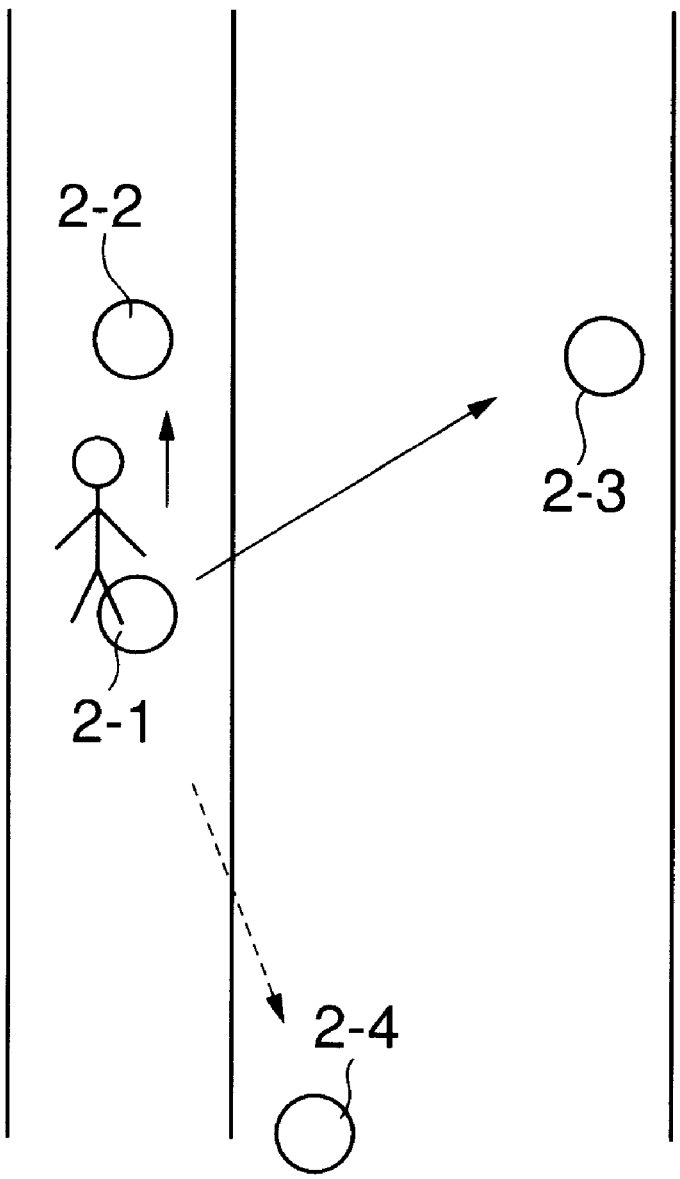
FIG. 10 is a conceptual diagram used for explanation using the flowchart shown in FIG. 9.
Figure 11:
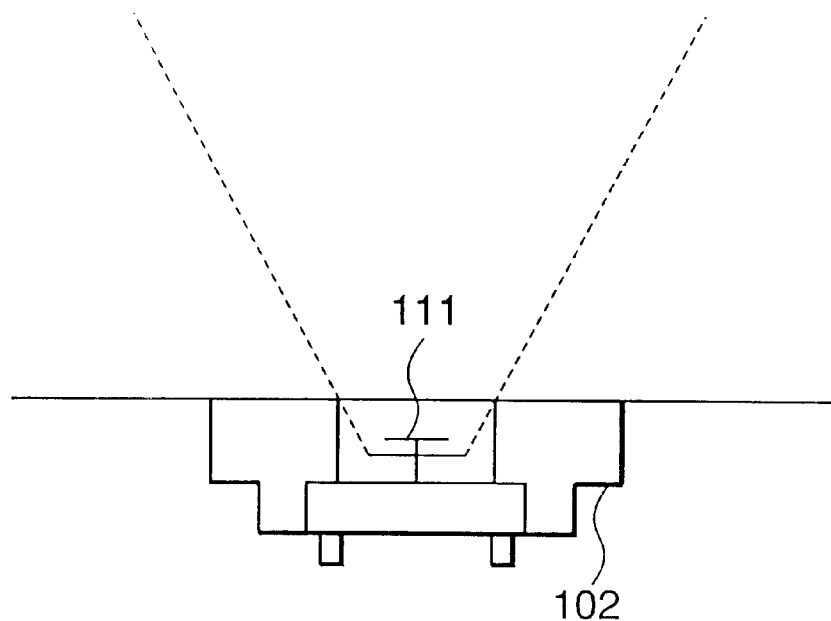
FIG. 11 is a diagram for explanation of a problem with the conventional manhole type base station.
Figure 12:
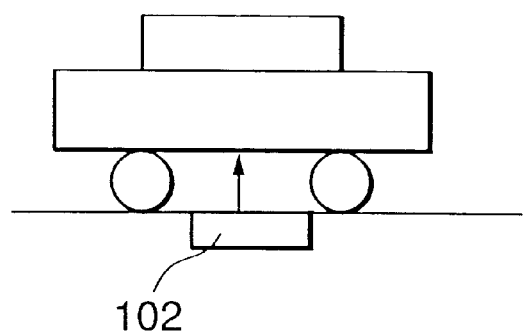
FIG. 12 is a diagram for explanation of a problem with the conventional manhole type base station.

FIG. 9 is a flowchart for explanation of a hand-off operation in the mobile communication system shown in FIG. 2, and FIG. 10 is a conceptual diagram used for explanation using the flowchart shown in FIG. 9.

As described above, in the case where a person, a car or the like is put on the manhole cover 10 (refer to FIGS. 3(a) and 3(b)) of the manhole type base station 2-1, its pressure is detected by the pressure sensor 17 (refer to FIGS. 3(a) and 3(b)), thereby detecting that the person, the car or the like is put on the manhole cover of the manhole cover 10 (refer to FIGS. 3(a) and 3(b)). Also, in the case where the upper surface portion of the manhole cover 10 (refer to FIGS. 3(a) and 3(b)), in the manhole type base station 2-1 is covered with a car or the like, an electric wave transmitted from the transmit/receive antenna 11 (refer to FIGS. 3(a) and 3(b)) is reflected by the car or the like which covers the manhole cover 10 (refer to FIGS. 3(a) and 3(b)), and its reflected wave is detected by the electric wave sensor 18 (refer to FIGS. 3(a) and 3(b)), thereby detecting that the upper surface portion of the manhole cover 10 (refer to FIGS. 3(a) and 3(b)) is covered with the car or the like.

Upon detection, the above-described detection result is transmitted to the base station control unit 3 as an electric wave interruption state, and the base station control unit 3 starts the hand-off control (Step S1).

The hand-off control of another base station according to this embodiment is not conducted on the basis of the calculation result obtained by calculating the electric field intensity of the base station, but conducted in a short period time by transmitting the above-described electric wave interruption state to the base station control unit 3.

Then, the hand-off candidature base station is detected. First, as an initial hand-off candidature, it is detected from a state of using a manhole type base station 2-2 closest in distance from the manhole type base station 2-1 whether there exists a free radio channel, or not (Step S2).

If it is detected in Step S2 that the free radio channel exists in the manhole type base station 2-2, the hand off is conducted on the manhole type base station 2-2 (Step S3).

On the other hand, if it is not detected in Step S2 that the free radio channel exists in the manhole type base station 2-2, it is detected from a state of using a manhole type base station 2-3 second closest in distance from the manhole type base station 2-1 whether there exists a free radio channel, or not (Step S4).

If it is detected in Step S4 that the free radio channel exists in the manhole type base station 2-3, the hand off is conducted on the manhole type base station 2-3 (Step S5).

On the other hand, if it is not detected in Step S4 that the free radio channel exists in the manhole type base station 2-3, it is detected from a state of using an preliminary manhole type base station 2-4 whether there exists a free radio channel, or not (Step S4). If it is detected that the free radio channel exists in the manhole type base station 2-4, the hand off is conducted on the manhole type base station 2-4 (Step S6).

The above-described hand-off control operation exhibits one example, and the hand-off control operation is optimized in accordance with a state in which the manhole type base station is located, a state of the distribution of the electric field intensity of the service area, a traffic state of the radio channel such as the number of mobile stations or a period of time during which the mobile station is used, etc.

The above-described structure of the present invention has the advantages stated below.

(1) Because the space in which the transmit/receive antenna is disposed has such a slope that the space expands from the base station unit toward the upper surface portion of the manhole cover, a range that enables the electric wave to be transmitted by the transmit/receive antenna and a range that enables the electric wave to be received by the transmit/receive antenna are expanded, thereby being capable of ensuring a larger service area.

(2) Because the height of the transmit/receive antenna is adjustable, if the height of the transmit/receive antenna is made high, a range that enables the electric wave to be transmitted by the transmit/receive antenna and a range that enables the electric wave to be received by the transmit/receive antenna are expanded so that a still larger service area can be realized.

(3) In the case where the pressure sensor for detecting a pressure applied to the manhole cover is disposed at a portion where the manhole cover is in contact with a portion of the ground which supports the manhole cover, and the pressure detected by the pressure sensor is larger than a predetermined value, the control of the communication operation of the mobile station is switched to another manhole base station. As a result, an electric field intensity in the base station is not calculated or processed when an obstructive exists on the manhole cover, thereby being capable of conducting the hand-off control in a short period of time for preventing the occurrence of a trouble such as a reduction in service area or the interruption of communication.

(4) In the case where the electric wave sensor for detecting a reflected wave of an electric wave radiated from the transmit/receive antenna is provided, when the reflected wave of an electric wave transmitted from the transmit/receive antenna is detected by the electric wave sensor, the control of the communication operation of the mobile station is switched to another manhole base station. As a result, an electric field intensity in the base station is not calculated or processed when an obstructive exists on the manhole cover, thereby being capable of conducting the hand-off control in a short period of time for preventing the occurrence of a trouble such as a reduction in service area or the interruption of communication.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A manhole base station, comprising:
   a base station unit for controlling communication with a plurality of mobile stations;
   a transmit/receive antenna disposed in a space defined above said base station unit and directed to an upper surface of a manhole cover for transmitting and receiving an electric wave signal, said base station unit and said transmit/receive antenna being disposed in the interior of said manhole cover;
   wherein said space in which said transmit/receive antenna is disposed expands toward an upper surface portion of said manhole cover from said base station unit; and
   hand-off means for conducting a hand-off based on a pressure applied to said manhole cover.

2. A manhole base station as claimed in claim 1, wherein said transmit/receive antenna is adjustable in height with respect to an upper surface portion of said manhole cover.

3. A manhole base station as claimed in claim 1, wherein the pressure is detected by a pressure sensor which is disposed at a portion where said manhole cover is in contact with a portion of the ground which supports said manhole cover for detecting the pressure applied to said manhole cover.

4. A manhole base station as claimed in claim 1, wherein, when the pressure is applied to said manhole cover, the hand-off means hands-off the communication to one of a plurality of adjacently-positioned manhole base stations.

5. A manhole base station as claimed in claim 4, wherein, when the pressure is applied to said manhole cover of said manhole base station, the hand-off means hands-off the communication to the one of the adjacently positioned manhole base stations to overcome blockage of the transmit/receive antenna of said manhole base station caused by an object that provided the pressure to said manhole cover of said manhole base station.

6. A manhole base station, comprising:
   a base station unit for controlling communication with a plurality of mobile stations;
   a transmit/receive antenna disposed on said base station unit toward an upper surface of a manhole cover for radiating and receiving an electric wave signal, said base station unit and said transmit/receive antenna being disposed in the interior of said manhole cover;
   wherein said transmit/receive antenna is adjustable in height with respect to an upper surface portion of said manhole cover; and
   hand-off means for conducting a hand-off based on a pressure applied to said manhole cover.

7. A manhole type base station as claimed in claim 6, wherein the pressure is detected by a pressure sensor which is disposed at a portion where said manhole cover is in contact with a portion of the ground which supports said manhole cover for detecting the pressure applied to said manhole cover.

8. A manhole base station as claimed in claim 6, wherein, when the pressure is applied to said manhole cover, the hand-off means hands-off the communication to one of a plurality of adjacently-positioned manhole base stations.

9. A mobile communication system, comprising:
- a plurality of manhole base stations for controlling communication with a plurality of mobile stations, each of said manhole base stations including a manhole cover;
- a control unit connected to said manhole base station through a transmission path for controlling the communication operation of said manhole base station;
- a switching center connected to said control unit and a public telephone network for conducting switching operation with a plurality of said mobile stations and said public telephone network: and
- hand-off control means for controlling a hand-off of said manhole base stations based on a pressure applied to the respective manhole covers of said manhole base stations.

10. A mobile communication system as claimed in claim 9, wherein, when the pressure is applied to one of said manhole covers of a corresponding one of said manhole base stations, the hand-off control means of said corresponding one of said manhole base stations hands-off the communication to another of said manhole base stations that is located adjacent to said one of said manhole base stations.

11. A mobile communication system as claimed in claim 10, wherein, when the pressure is applied to said manhole cover of said manhole base station, the hand-off control means hands-off the communication to said another of said manhole base stations to overcome blockage of the transmit/receive antenna of said manhole base station caused by an object that provided the pressure to said manhole cover of said manhole base station.

12. A mobile communication system, comprising:
- a plurality of manhole base stations each using a corresponding manhole for controlling communication with a plurality of mobile stations, each of said manhole base stations including a transmit/receive antenna;
- a control unit connected to said manhole base station through a transmission path for controlling the communication operation of said manhole base station;
- a switching center connected to said control unit and a public telephone network for conducting switching operation with a plurality of said mobile stations and said public and telephone network; and
- hand-off control means for controlling hand-off of said manhole base stations based on a reflected wave of an electric wave transmitted from the respective transmit/receive antennas of said manhole base stations.

13. A mobile communication system as claimed in claim 7, wherein the pressure is detected by a pressure sensor which is disposed at a portion where said manhole cover is in contact with a portion of the ground which supports said manhole cover for detecting the pressure applied to said manhole cover.

14. A hand-off control method in a mobile communication system as claimed in claim 13, wherein when the reflected wave of an electric wave transmitted from said transmit/receive antenna is detected by said electric wave sensor, the control of the communication with said mobile station is switched to another manhole base station.

15. A hand-off control method in a mobile communication system as claimed in claim 13, wherein when the pressure detected by said pressure sensor is larger than a predetermined value, the control of the communication with said mobile station is switched to another manhole base station.

16. A mobile communication system as claimed in claim 8, wherein the pressure is detected by a pressure sensor which is disposed at a portion where said manhole cover is in contact with a portion of the ground which supports said manhole cover for detecting the pressure applied to said manhole cover.

17. A hand-off control method in a mobile communication system as claimed in claim 16, wherein when the pressure detected by said pressure sensor is larger than a predetermined value, the control of the communication with said mobile station is switched to another manhole base station.

18. A hand-off control method in a mobile communication system as claimed in claim 16, wherein when the reflected wave of an electric wave transmitted from said transmit/receive antenna is detected by said electric wave sensor, the control of the communication with said mobile station is switched to another manhole base station.

19. A hand-off control method in a mobile communication system as claimed in claim 12, wherein when the pressure detected by said pressure sensor is larger than a predetermined value, the control of the communication with said mobile station is switched to another manhole base station.

20. A mobile communication system as claimed in claim 12, wherein, when the pressure is applied to one of said manhole covers of a corresponding one of said manhole base stations, the hand-off control means of said corresponding one of said manhole base stations hands-off the communication to another of said manhole base stations that is located adjacent to said one of said manhole base stations.

* * * * *